May 31, 1960  F. WERNER  2,938,270
PRECISION MEANS FOR MEASUREMENT OF ANGLES
Filed Oct. 4, 1956  2 Sheets-Sheet 1
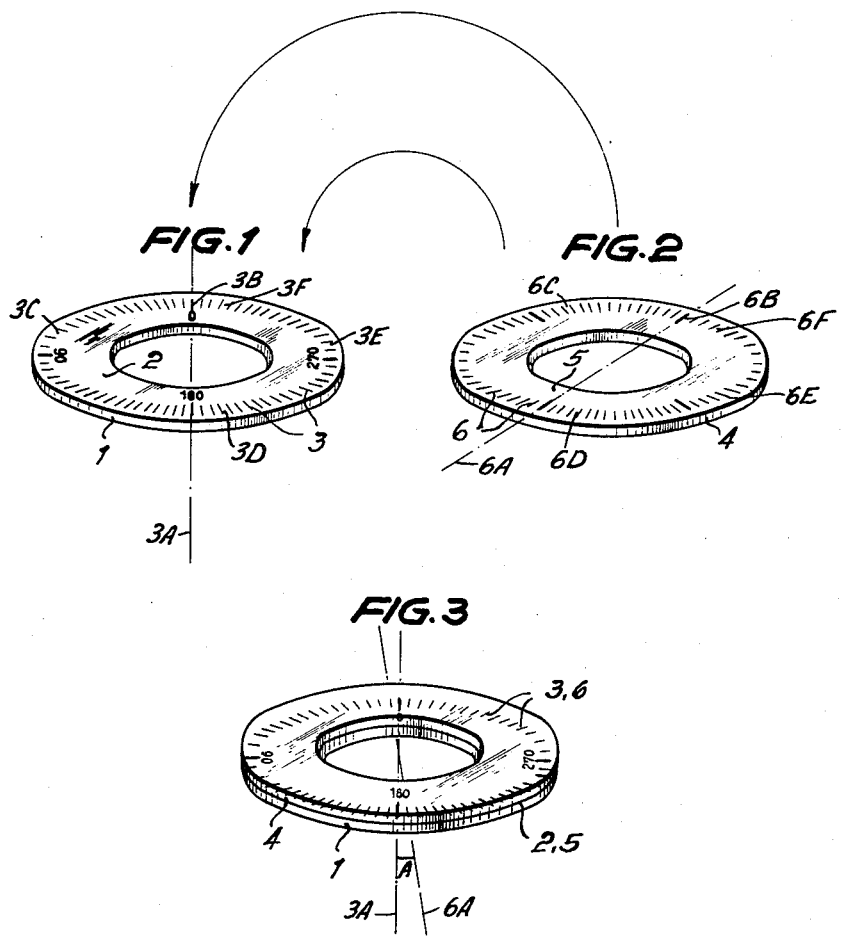
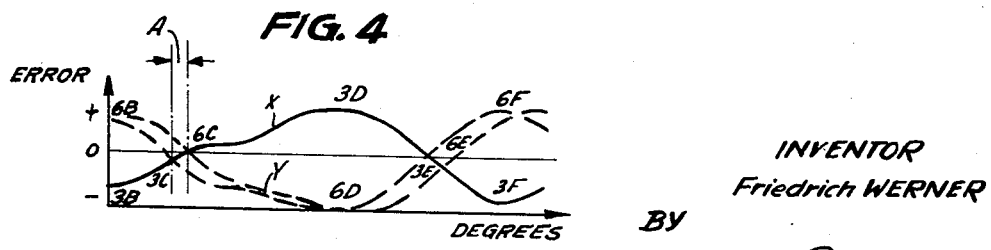
INVENTOR
Friedrich WERNER
BY
F. D. Rrgers
ATTORNEY

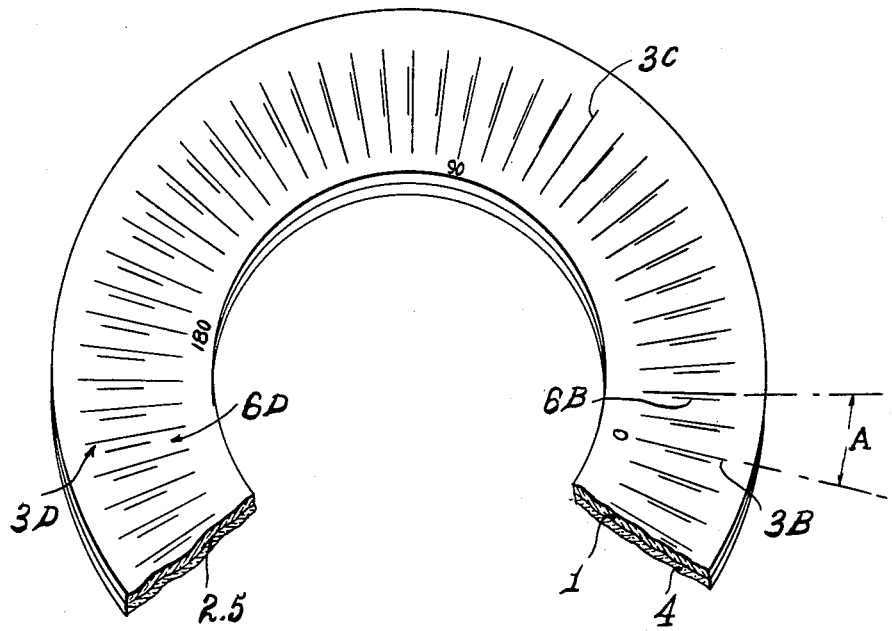

United States Patent Office 2,938,270
Patented May 31, 1960

2,938,270

PRECISION MEANS FOR MEASUREMENT OF ANGLES

Friedrich Werner, Berlin-Nikolassee, Germany, assignor to Askania-Werke A.G., Berlin-Friedenau, Germany, a corporation of Germany Filed Oct. 4, 1956, Ser. No. 613,977

Claims priority, application Germany Oct. 14, 1955

3 Claims. (Cl. 33—1)

This invention relates to instruments provided with graduated circles and it has to do particularly with precision means for measuring angles. The object of the invention is, to add to the precision obtainable with instruments and means of this type.

Circle divisions to be used in precision devices are conventionally made on mechanical graduation machines which have high precision themselves; but it is known that, no matter how accurately the mechanism may be constructed, certain errors of graduation remain, in the making of the division. It is also known that such errors, caused by imperfections of gears and the like, have a certain periodicity. Attempts have therefore been made to compensate for such errors by providing a division carrier, not with a single precision graduation but with two of them, the second being used for compensating the errors of the first; and for this purpose the second graduation—sometimes concentric to the first—has been transposed relative to the first by an angle the magnitude of which has been made dependent on the wave length of what is known as the error curve of the first graduation.

While such systems have definite advantages, there are still shortcomings, therein, both as to their use and as to their production. In their use, two readings are required for each basic angle reading; and this requires manipulations of the optical micrometer or other reading device between concentric or interlaced systems of markers, as well as it requires special computations based on the different readings. In the production of such devices, special arrangements are required in the dividing machine; and yet the danger of rejects is seriously increased, particularly when the second division is applied after the first.

The invention provides a new system for the division of circles in instruments of the type in question, which is free from the shortcomings referred to and which, according to actual findings, is frequently much superior to known systems as to compensation of errors. According to the invention, a second circle division is again used for error compensation, but it combines the first circle with a second circle which is side-reversed relative to the first as will be explained hereinafter.

A schematic indication of this arrangement has been given in the drawing, wherein Figure 1 is a perspective view of the first circle; Figure 2 is a similar view of the second circle; and Figure 3 is a similar view of a combined circle. Figure 4 shows the aforementioned error curve of a typical circle division. Figure 5 is an enlarged detail from Figure 3.

Figure 1 shows at 1, a glass circle which may be assumed to have been made on a conventional circle dividing machine, without special attachments, by conventional operations; of course it is desirable to make it as carefully and accurately as possible by means of such a machine. Surface 2 of this circle has thus been provided with a complete graduation 3.

Figure 2 shows a second glass circle 4, identically provided with an analogous division 6 on surface 5, by the same machine, except that, as shown, marks of circle 1 may be numbered while marks of circle 4 may be unnumbered. As shown by the curved arrow, circle 4 is brought into confronting coaxial relationship with circle 1.

As further shown in Figure 3, the surfaces 2, 5 carrying the graduations 3, 6 are then in contact with one another.

Each circle graduation 3, 6 may be assumed to have an axis 3A, 6A, provided for instance by the diameter which passes through the first graduation mark 3B, 6B made in the dividing process, on the respective circle 1, 4. These axes 3A, 6A, in the combined circle 1, 4 of Figure 3, are not coincident with one another; they are angularly displaced relative to one another, in the plane of the coincident surfaces 2, 5. The desirable angularity A of such displacement depends on the exact shape of the curve X of periodic errors, Figure 4, typically made by the machine in dividing circles 1, 4, etc. with the greatest attainable accuracy. When this curve X has been determined and two circles 1, 4 have been made on the machine, in the conventional way, and when these circles have been confronted with one another as shown in Figure 3, it will be obvious herefrom that a certain angular displacement A provides maximum compensation of the errors represented by the curve, and how large the displacement A has to be. However, in the interest of clarity a full statement of the reason for this fact may be given as follows. If identical divisions confronted one another, with side reversal, which had only a purely periodic error, it would be possible to obtain complete coincidence (zero error) for at least two pairs of marks 3C, 6C and 3E, 6E, with zero displacement A. Actually, as is well known, circles cannot be fully identical, they are subject to errors in slightly different ways, so that the error curve Y of any second circle 4 is only approximately identical with the curve X of circle 1 (Figure 4). Thus the curves X and Y can be only approximately symmetrical with one another about the zero error line. It is obviously possible, however, to obtain a relatively high degree of symmetry between the curves (corresponding with maximum approximation to true symmetry between relatively widely displaced marks, in areas of maximum error such as 3D, 6D), by a slight angular shift A between curves X and Y, the direction and amount of such shift being dependent on the actual distribution of errors in each pair of circles to be combined. For instance, according to Figure 4 as shown, it would be desirable to shift curve Y a slight distance toward the right (corresponding with a counterclockwise shift A of circle 4).

The two circles 1 and 4 are cemented together. Insofar as is visible on the scale of Figures 1, 2 and 3, the graduations of both circles may have equal radial length but actually it is desirable to confine the graduations of one circle, for instance circle 4, within a ring area coinciding only with an inner or outer or (Figure 5) intermediate ring portion of the graduation ring of the other circle, No. 1. It further appears on the scale of Figures 1 to 3 that the graduations of both parts of the combined circle 1, 4 completely coincide, but actually, as mentioned, this is the case only as to few graduations such as 3C, 6C and/or 3E, 6E, the location of which (see Figure 5) depends on the shape of the error curve (Figure 4).

According to a modified form of the invention the second circle 4 is not independently made on the machine which has made the first circle 1; rather, both circles are dimensionally identical although symmetrically reversed copies of a master circle, or, as a further modification, the second circle is such a copy of the first. Such a dimensionally identical but reversed copy can be made for instance by photographic negative printing by the contact process. In each of these cases a circle is combined with an identical but reversed and rotated copy thereof.

This may be preferred because it has been found by experience, as mentioned, that a plurality of circles, consecutively made on the same dividing machine, are not error-bound in absolutely the same way.

It may be noted that, when photographic methods are used as suggested, it is also possible to incorporate both graduations—the basic one and the identical but side-reversed and rotated one—on a single glass plate or carrier. This can be achieved for instance by first making a precise, conventional division 3 on a carrier 1 and then copying this division twice on a second carrier 4, by the photographic contact process, once in any desired orientation as shown at 6 and the second time, with the graduation 3 side-reversed and the axis 3A rotated as indicated above.

I claim:

1. A divided circle for precision measurements of angles, comprising: a pair of circular division carriers, cemented to one another, at least one of said carriers being transparent; two systems of division marks, one concentrically disposed on the cemented surface of each carrier, the marks of each system being spaced from one another by angular distances which are uniform, subject to small periodic errors, said errors being at least generally similar in the two systems; the system of one carrier being side-reversed relative to that of the other carrier and the two systems being so arranged relative to one another that their periodic error curves are at least approximately symmetrical about a zero error position.

2. A circle as described in claim 1 wherein the system of division marks disposed on one of said carriers is a photographic copy of the system disposed on the other carrier.

3. A circle as described in claim 1 wherein one of the two systems of division marks has numerals associated with division marks thereof.

References Cited in the file of this patent

UNITED STATES PATENTS

| 2,266,287 | Thom | Dec. 16, 1941 |
| 2,393,873 | Thurston | Jan. 29, 1946 |
| 2,619,002 | Baker | Nov. 25, 1952 |

FOREIGN PATENTS

| 342,757 | Great Britain | Feb. 5, 1931 |
| 905,672 | Germany | Mar. 4, 1954 |

OTHER REFERENCES

Werner: German application Ser. No. A21174, printed Sept. 8, 1955 (Kl. 42b Gr. 15), (spec. 2 pgs.).